United States Patent
Dyer

(10) Patent No.: US 7,011,486 B2
(45) Date of Patent: Mar. 14, 2006

(54) PORTABLE HOISTING DEVICE

(76) Inventor: Robert Anthony Dyer, 44 Mayland, Portland, ME (US) 04103

( * ) Notice: Subject to any disclaimer, the term of this patent is extended or adjusted under 35 U.S.C. 154(b) by 138 days.

(21) Appl. No.: 10/404,500

(22) Filed: Apr. 1, 2003

(65) Prior Publication Data

US 2004/0197177 A1    Oct. 7, 2004

(51) Int. Cl.
  *F16B 43/02*    (2006.01)
(52) U.S. Cl. ............... 414/542; 212/180; 212/270; 414/812
(58) Field of Classification Search ............ 414/542, 414/812; 280/766.1; 212/180, 270
  See application file for complete search history.

(56) References Cited

U.S. PATENT DOCUMENTS

| | | | |
|---|---|---|---|
| 1,464,131 A | * | 8/1923 | Goodger ............ 414/542 |
| 2,773,606 A | * | 12/1956 | Shepherd ............ 414/23 |
| 3,276,610 A | * | 10/1966 | Thatcher ............ 414/541 |
| 3,794,192 A | * | 2/1974 | Monson ............ 414/541 |
| 3,825,095 A | * | 7/1974 | Clark ............ 182/17 |
| 3,863,782 A | * | 2/1975 | Sandrock ............ 414/542 |
| 4,629,390 A | * | 12/1986 | Burke ............ 414/527 |
| 4,872,581 A | * | 10/1989 | Wedhorn ............ 212/180 |
| 4,930,970 A | * | 6/1990 | Sunderland ............ 414/542 |
| 5,028,198 A | * | 7/1991 | Buhr ............ 414/542 |
| 5,622,299 A | * | 4/1997 | Berard ............ 224/403 |
| 5,743,702 A | * | 4/1998 | Gunderson ............ 414/542 |
| 5,862,926 A | | 1/1999 | Johnson |

* cited by examiner

*Primary Examiner*—Thomas J. Brahan
(74) *Attorney, Agent, or Firm*—Thomas L. Bohan; Patricia M. Mathers

(57) ABSTRACT

A collapsible, portable hoist that can be assembled and operated by a single individual, for lifting and conveying heavy objects onto and off of trucks, especially pickup trucks. When not in use, the hoist collapses down to a flat storage configuration that rests on, and is secured to, the truck's cargo walls without any portion extending beyond the truck. In order to deploy the hoist, one rotates its support frame up from the stowed position and then suspends from it the rail along which a trolley or other implement used to convey the object will travel. When the hoist is fully deployed, the trolley rail is mounted high above the bed, permitting tall objects to be manipulated. The hoist is constructed so as to be readily removable from the truck.

5 Claims, 7 Drawing Sheets

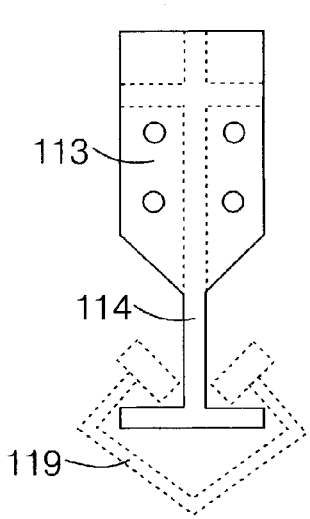
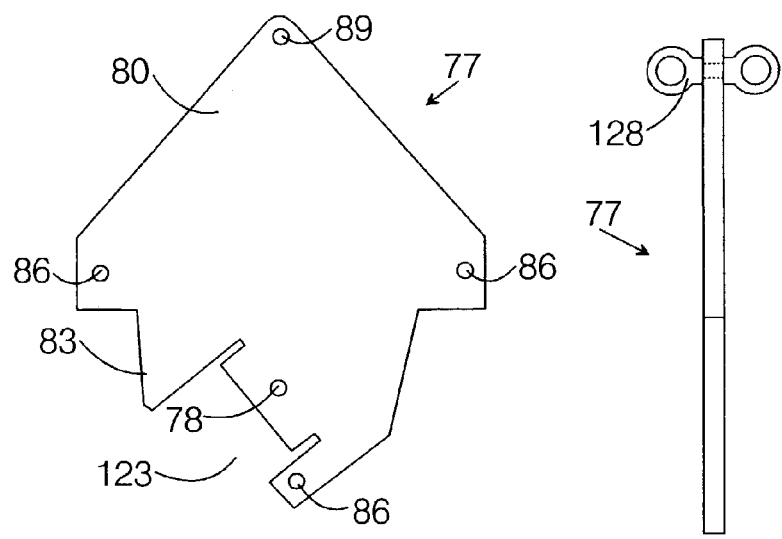
FIG. 6B　　　FIG. 7　　　FIG. 8
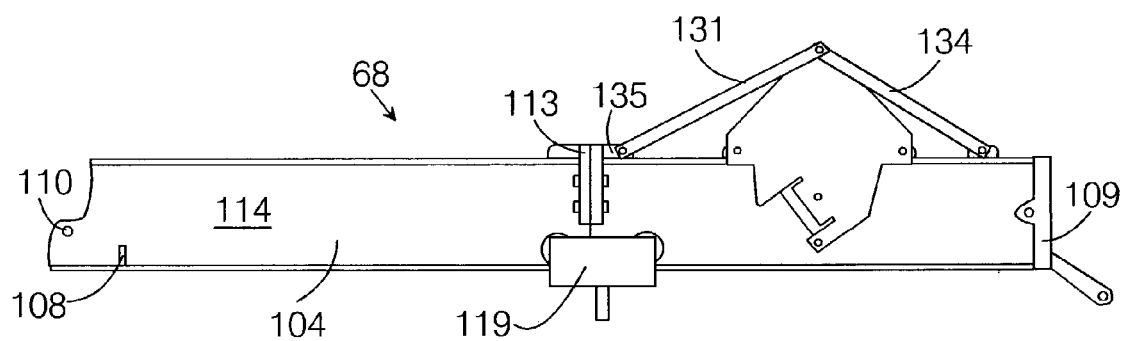
FIG. 6C
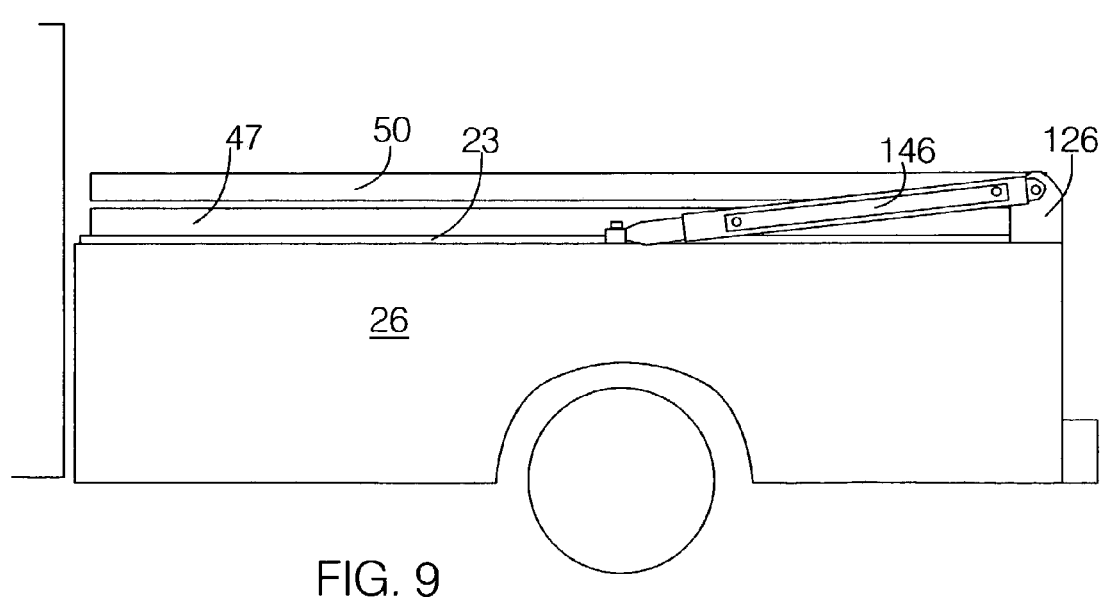
FIG. 9

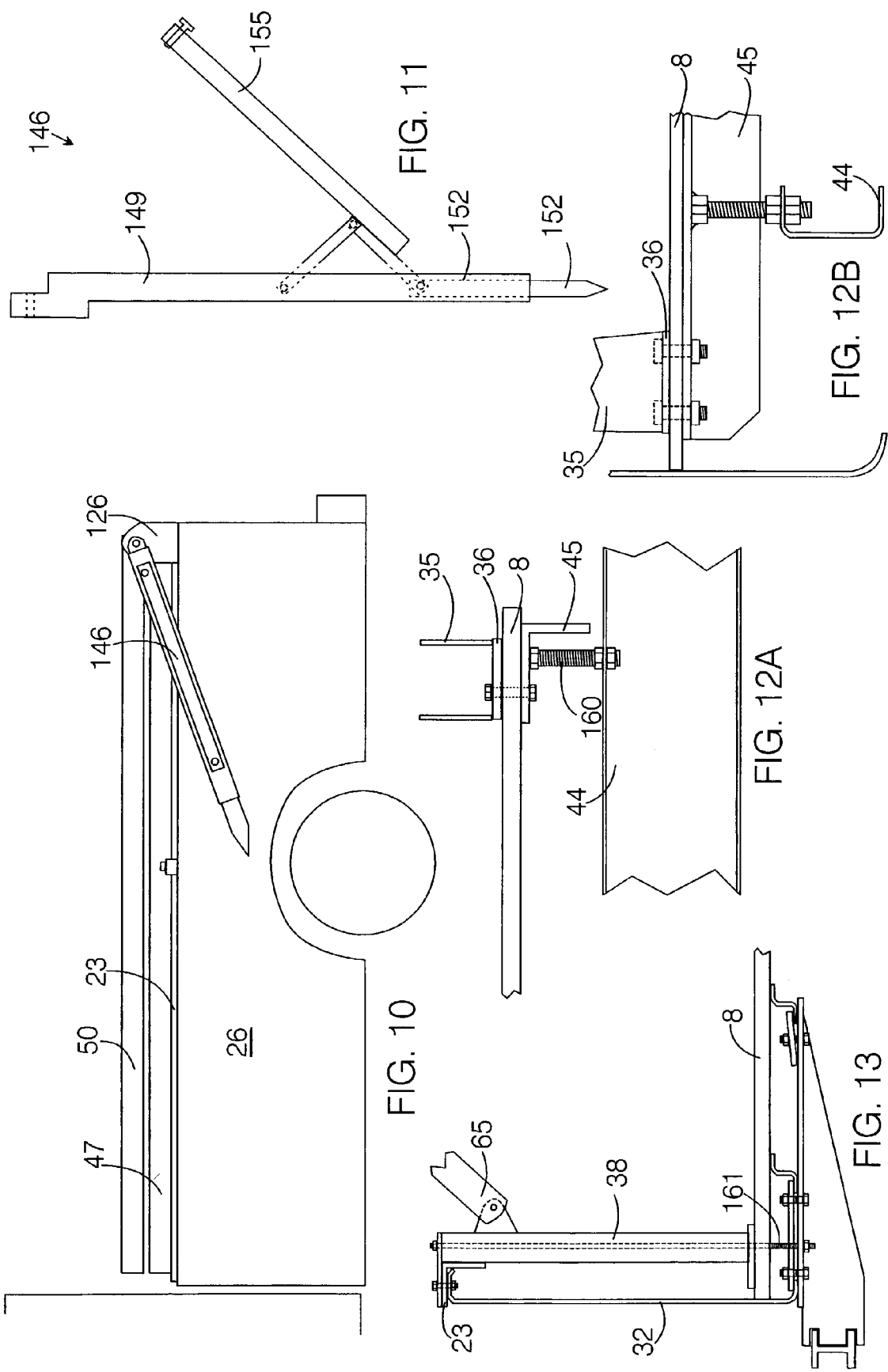

PORTABLE HOISTING DEVICE

BACKGROUND OF THE INVENTION

1. Field of the Invention

This invention relates to hoisting devices. More particularly, this invention relates to a collapsible and portable hoisting device for lifting heavy loads. More particularly still, this invention relates to such a hoisting device configured to be stowed on a small truck, such as a pickup truck, in such a manner that it is available for ready deployment and use in moving a heavy object either onto or off of the truck.

2. Description of Prior Art

Hoisting devices are used to lift and convey objects weighing several hundred to several thousand pounds without the need to use power equipment such as forklifts or mobile cranes. Numerous such devices are used in industrial settings, where they are often used to load and unload trucks. Industrial-sized hoists for such purposes are typically very large and usually permanently installed at hoisting stations dedicated to the requirements of a particular type of truck. They do not provide any help for the occasional need to hoist a heavy object, or even, for the need of the many individuals and businesses that deliver and pick up heavy objects repeatedly at locations not equipped with any type of hoisting or lifting mechanism. For example, individuals and businesses with pickup trucks have periodic need to transport such things as bricks, lumber, logs, large stones, trees with root balls, mechanical systems and office supplies. These and other items routinely need to be delivered to various construction sites and other locations, but not to the extent that would justify the expense of installing a permanent hoisting mechanism at any one of these sites. Thus, and especially for the intermediately heavy loads—those that are very heavy but still capable of being lifted by one or two workers, such as a packet of roofing tiles or bricks for a fireplace the burden of loading and off-loading frequently falls on the arms and backs of the workers. Lifting and conveying of heavy objects by hand is considered to be the single largest source of on-the-job injury in occupations involving manual labor.

Ideally, a hoisting device for handling loads up to one to two thousand pounds would be installed on all the trucks that might be engaged in the type of pickup and delivery described above. Such a device must be capable of being stowed when not in use and readily erectable when needed. Furthermore, it is desirable that the device be such that it can be assembled, operated and disassembled by a single person within a reasonable time interval, say, less than an hour.

Several attempts have been made to provide a portable hoist for use with a pickup truck. For example, Johnson (U.S. Pat. No. 5,862,926) discloses a pickup-truck-loading hoist that can be disassembled for stowing when not needed. When deployed, it consists of a front frame and a rear frame that support a trolley rail running between the frames and extending out behind the rear frame, that is, out beyond the end of a truck bed. Unfortunately, the Johnson hoist disassembles into a large number of individual pieces for which there is no systematic mechanism for securely storing them in or on the truck. This means that the loose pieces must either be carried in the bed of the truck, or removed from the truck, pending the next need for the hoist. There are obvious disadvantages with each option. Moreover, there are other disadvantages with the Johnson hoist. When the pickup's bed is fully loaded, it appears to be difficult to disassemble and store the hoist. Also, deployment of the hoist requires that the pickup's tailgate be removed, the rear frame of the Johnson hoist needing to rest on the trailer hitch. Finally, the nature of the rear frame of the Johnson hoist serves as a serious bottleneck in the degree to which it restricts the size of a load that can be handled by the hoist and transported by the truck, because of the relatively small clearance that it permits between the carrying member and the bed of the truck on which it is installed. In addition, when deployed, the section of the rail extending beyond the back of the truck is not directly supported; it is cantilevered. Thus, the load that a rail of given bearing strength can support is less that it would be if it were supported closer to its end point. For lifting heavier loads, a heavier rail and/or additional frames and braces are required. The use of additional frames or braces, however, results in greater effort to assemble/disassemble the hoist. Or a heavier rail may be safely installed only by the efforts of two or more people, which is a disadvantage.

Sunderland (U.S. Pat. No. 4,930,970) also discloses a portable hoist for use with a pickup truck. The hoist of Sunderland consists principally of a vertical front post and a vertical rear frame that, when the hoist is assembled, support a trolley rail that extends rearward from the back of the truck bed. For disassembly, the post, frame and rail can be collapsed into the truck bed. This presents the same disadvantage as Johnson in that storing the hoist in the truck bed reduces the primary advantage of having a vehicle with a truck bed in the first place-valuable cargo space in the bed is occupied by the hoist.

The Sunderland hoist has other disadvantages. For example, if a load takes up the width of the bed, the hoist cannot rotate down into the bed for travel. In addition, when deployed, the section of the rail extending beyond the back of the truck is not directly supported. Thus, the load that a rail of given bearing strength can support is less than it would be if supported closer to its end point. For lifting heavier loads, a heavier rail and/or additional frames and braces are required. The use of additional frames or braces, however, results in greater effort to assemble/disassemble the hoist. Or a heavier rail may be safely installed only by the efforts of two or more people, which is a disadvantage. Lastly, the outrigger support system disclosed by Sunderland requires that the truck on which the system is to be installed undergo substantial modification. Use of the outriggers is desirable when loading/unloading heavy loads, to relieve stress on the truck's suspension system, but adding them in the Sunderland system is an added inconvenience.

What is needed, therefore, is a collapsible hoist mountable on a truck and easily deployed, operated and stowed by a single person. What is further needed is such a hoist that is capable of lifting an object that is initially several feet beyond the end of the truck and depositing it in the truck's cargo bed, where the object is equal in weight to the load-bearing capacity of the truck. What is yet further needed is such a hoist that occupies minimal space on the cargo bed when the hoist is deployed and minimal space when it is stowed. Finally, what is needed is such a hoist that is easily mounted on and detached from its host truck without the need to modify the truck's frame.

SUMMARY OF THE INVENTION

It is an object of the present invention to provide a hoist that is mountable on a small truck and is easily deployed, operated, and stowed by a single person. It is a further object to provide such a hoist that is capable of lifting a load having a weight up to the load-bearing capacity of the host truck, and of lifting and transporting such a load onto the truck cargo bed from a point several feet beyond the end of the truck and, when the host truck is a pickup truck, several feet beyond the lowered tailgate of the pickup truck. It is a further object to provide such a hoist that occupies a very small amount of bed space when collapsed and stowed in a pickup truck. Finally, it is an object to provide such a hoist that is easily mounted on and detached from a truck without the truck having to be substantially modified.

The basic idea of the invention is a two-yoke trolley rail support frame wherein the two yokes, a front yoke and a rear yoke, are initially stored together atop a truck's sidewalls, then rotated up from a reinforced bearing assembly, alternately referred to as the mounting frame. (In the Preferred Embodiment the bearing assembly is located near the rear of the sidewalls.) This bearing assembly is reinforced because the sidewalls of a pickup truck are not, by themselves, capable of supporting a hoist or the loads that would be handled by that hoist. While the Preferred Embodiment makes use of the following two methods of reinforcing the bearing assemblies, it is to be understood that other methods may be used as well to ensure that the weight of the load and support frame are not borne by the sidewalk and end wall, but rather are placed on an entity that can support it, thus shifting the burden away from the weak sidewalls and end wall. Method 1 makes use of a sidewall brace that attaches to the side of the bearing assembly nearest the truck's longitudinal centerline. The top of this sidewall brace attaches to the bearing assembly by bolting or other suitable means. The bottom of this sidewall brace bears on the cargo bed of the truck and may be bolted to the cargo bed or attached by some other means to the cargo bed. Optionally, the bottom of these sidewall braces maybe attached, with specialized fittings, to the truck's frame below that cargo bed. Method 2 of reinforcing the bearing assembly utilizes downriggers that attach to each side of the bearing assembly outboard of the cargo bed and pivot down to bear on the ground when necessary and pivot up to a stowed position when necessary. It should be understood that the front yoke may be substituted by a post, a bipod, a tripod or any other suitable means to support the forward end of the trolley rail.

Summarizing, the collapsible hoist of the present invention includes (1) a mounting frame that is designed to be placed atop the cargo walls which line three sides of the cargo bed, (2) a support frame designed to be pivotally affixed to the mounting frame. (3) a trolley rail ("rail") that depends from the support frame when the hoist system is fully deployed, and (4) various ancillary components to permit the first three elements to link together and to be effectuated. The rail provides a support and guide for the load-lifting and conveying mechanism, the rail's length determining the distance over which the load can be conveyed. For most embodiments of the invention, the rail consists of two I-beam segments, which, when deployed, are coupled together to make a track equal in length to the sum of their two individual lengths. In this manner, a maximum travel distance for the object being moved can be achieved while ensuring that the hoist can be stowed without extending beyond the back or out the sides of the truck. The mounting frame is secured atop the truck's sidewalls, in most embodiments, by additional coupling to the truck's longitudinal rails, as described below. It also includes outrigger-type support members for transferring some of the load's weight to the ground during loading and off-loading operations. In most embodiments these outriggers extend largely downward when in use, rather than angling away from the truck, and hence are "downriggers". The support frame includes, in major part, yokes from which the rail is suspended when the hoist is fully deployed. Each of the yokes has a crossbar that will extend horizontally across the width of the truck bed when mounted on the truck, regardless of whether they are deployed. Each yoke crossbar extends between, and links together, two yoke legs. The leg ends opposite the crossbar are coupled pivotally to the mounting frame, generally to a reinforced yoke-bearing assembly constituting part of the mounting frame and located near the rear of the truck. Some embodiments could use yokes with telescoping, or otherwise extensible, legs to gain additional vertical clearance or lateral reach for certain needs.

The manner in which the support frame is attached to the mounting frame permits especially rapid deployment (and stowing) of the hoist. This means that it can be quickly swung about the pivot point(s) (bearings) into its operating configuration and then, after being used to move a heavy object, swung back down into its stowed position. Overall, the time required to set up the hoist and make it ready to lift a one-ton object, has been measured to be approximately 20 minutes, starting with the hoist in a completely stowed configuration.

Another feature of the invention going to meet the objectives stated above is the option of using a rail made up of two segments, each of which is equal in length to the length of the truck's bed. This permits a maximal travel of the load being conveyed by the hoist and yet permits the hoist to be stowed completely on board the host truck with no elements extending beyond the cargo bed. This is not to rule out embodiments that use a single unitary beam as the trolley rail or, for that matter, collapsible rails made of more than two segments.

Another important element of the present invention is its dual approach to maximizing the vertical clearance available between the trolley rail and the bed of the truck. Two elements contribute to this great clearance. First, the mounting frame (which is really the base of the hoist system) is designed to be placed atop the sidewalls of the truck's cargo compartment. That, by itself, provides one to two feet additional clearance over that provided by most, if not all, of the prior-art hoists associated with pickup trucks. The additional clearance provided by basing the hoist atop the cargo walls more than justifies the additional support thereby necessitated for the cargo walls.

To provide yet further clearance consistent with a support frame limited in size by the requirement that it be completely stowable within the confines of the host truck, the support frame is shaped so that the trolley rail can be placed nearly as high as the support frame itself, even though it is to be suspended from the support frame. This is done by cutting away much of the rail at that point where it couples to the support frame. Again, the supplemental strengthening of the rail in that region necessitated by this approach is more than justified in most applications by the increased clearance thereby provided. Truly tall, as well as heavy, objects can thus be hoisted and conveyed onto the pickup truck with the present invention. However, it should be borne in mind that for some applications of the present invention, it may be possible or even desirable to use an embodiment of the invention that does not entail cutting a notch in the rail.

In the Preferred Embodiment hoist, the supplemental support for the cargo walls includes coupling of the hoist mounting frame to the longitudinal frame rails of the truck, without, however, the need to make any holes in the truck's frame or to weld anything to that frame. Other embodiments may simply add a weight-distributing plate to the bottom of the sidewall-support braces, where the plate is then supported by the truck's cargo-bed. Yet other embodiments may make use of holes made in the truck's frame or may weld to the truck's frame.

When collapsed, the hoist separates into substantially flat elements that are securely stowable atop the host truck's cargo walls. It is to be emphasized that the collapsed hoist takes up a very small portion of the bed itself when stowed. More particularly, both the front and rear yokes fold down toward the front of the truck, both coming to rest atop that portion of the mounting frame that resides atop the three cargo walls. In the Preferred Embodiment, after the yokes are stowed, each segment of the trolley rail is then secured along the side cargo walls (sidewalls) atop the yoke's legs.

As stated, the support frame (the two yokes) is pivotally attached to the mounting frame generally at a position near the back of the truck when the hoist is mounted on a truck. More particularly, the yokes of the support frame are attached to the mounting frame by means of yoke bearings. For embodiments with two yokes and two yoke bearings, there will be a right yoke bearing atop the right sidewall near its rear end and, directly across from it, a left yoke bearing atop the left sidewall. Both yokes are coupled to the same portion of the mounting frame and share a common pivot axle on each yoke bearing. Thus, the right legs of both yokes attach to the right bearing assembly portion of the mounting frame and the left leg to the left bearing assembly portion of the mounting frame, but in such a way that the two yokes can pivot independently of one another on the common pivot axles. For simplicity, the Summary discussion will from this point out, treat the hoist as having two yokes and two yoke bearing assemblies. Other embodiments may have mounting frames that provide the respective yokes with bearings independent of each other; hence, for example, the front yoke would have right and left bearing assemblies and the rear yoke would have right and left bearing assemblies, for a total of four bearing assemblies in the mounting frame.

As a heavy object is being lifted off the ground in order to be conveyed onto the truck, or as an object already on the truck is conveyed rearward as part of the off-loading process, the rear end of the truck will tend to sink down as the truck's rear suspension takes on more weight. It is essential for efficient operation of the hoist system that this sinking down be minimized. It is also essential to alleviate some of the stress from the truck's rear suspension so as to not cause harm to that rear suspension. In addition, otherwise, even without the cantilevered rail bending under the weight of the load, the initially horizontal rail becomes a rail that runs "uphill" as one goes from the rear of the truck to the front. Pulling a one-ton load "uphill", even with the most smoothly operating beam trolley, is not something to be desired by the single operator doing the work. Thus, the downriggers play an important role, as they limit the degree to which the rear end of the truck can be forced down. It is generally a good rule of practice to deploy the downriggers at the start of the loading/unloading process, after having positioned the truck so that its hoist can reach the load. And it is generally a good rule of practice to stow the downriggers just prior to driving the truck away after completing the loading/unloading process.

In some embodiments of the invention, the downriggers are pivotally attachable to the top of the rear portion of the sidewalls or to the mounting frame, in such a manner that they can be deployed downward into load-bearing position as needed and otherwise remain folded up out of the way along the outside of the sidewall. In the Preferred Embodiment, the downriggers are pivotally attached to the reinforced yoke bearing assemblies and share their pivot axles with the yokes. In the Preferred Embodiment, they are constructed and placed in such manner that when initially deployed, they do not reach the ground. However, as the rear end of the truck is pressed down during the loading process, the downriggers lower and engage the ground and, from that point, support the balance of the load. Once the object is loaded on the truck, and the truck is ready to be driven away, it is necessary to retract the downriggers, transferring the entire load to the truck's suspension for the first time. To achieve one of the purposes of the present invention, it is necessary that a single operator be able to quickly retract the downriggers, and, in particular, to avoid the necessity of a separate intermediate step, such as shifting the truck's weight to a jack so as to be able to release the compression forces on the downrigger so that it can be swung up for stowing. There are a number of ways to achieve this through the design of the downrigger. For example, a lever mechanism may be built in to allow for a gradual retraction (shortening) of the downrigger and hence reduction of the force being supported by it, thereby smoothly and gradually shifting the load to the truck's suspension. Other embodiments may use other types of outriggers, downriggers or temporary supports.

It can be seen that a similar situation prevails when an object is being offloaded from the truck. Initially, the object will be sitting on the bed of the truck and the truck's suspension will be bearing the entire weight. However, in general, the load may be far enough forward that the weight is somewhat distributed between the front and rear axles, so that the truck's rear end may not lowered to the point where the truck displays a severe pitch. When the load is lifted by the hoist prior to subsequent conveyance rearward, nothing changes. However, as the load is moved rearward, significant pitch will occur unless the downriggers have been deployed. There is no problem retracting the downriggers when this off-loading is complete, since at the end of the unloading process, the weight will have been deposited on the ground or elsewhere and will no longer be loading down the rear end of the truck.

In most embodiments of the hoist, the rail segments are stored on top of everything else on the truck's sidewalls. When starting to assemble the hoist, one first removes the rail segments and temporarily lays them aside. Next, assuming that the yoke that is stowed directly beneath the rail segments is the rear yoke, that yoke is lifted up by its crossbar and swung around on the pivot axles (bearings) until its legs extend to the rear making an angle with the vertical approximately equal to its operating angle, which, in most embodiments, will be approximately 45 degrees. At that point, the rear yoke is temporarily fixed in place so that it holds that angle. This can be done by any of a variety of means, including—as an example and not as a means of suggesting a limit of the possibilities—the provision of yoke anchor detents that mate with complementary features in the yoke's legs. As another, simpler, example, one can simply attach a cord of a strategic length to the rear yoke. It is to be emphasized that the techniques proposed for deploying and stowing the hoist are guided by the invention's requirement that these actions must be reasonably performable by a single individual, working alone. In any event, once the rear yoke is temporarily fixed in place, the front yoke may be rotated up by lifting its crossbar, which, like that of the rear yoke, is stowed atop the front wall of the cargo area. When the front yoke has been rotated to the point where it is oriented at about 45 degrees from the vertical toward the front of the truck, it is linked to the rear yoke in such a way that the maximum angle that can exist between the front and rear yokes is fixed; this angle will be approximately 90 degrees. In the Preferred Embodiment, a cord of strategic length, between the mounting frame and the front yoke legs, holds the front yoke at its deployed position of approximately 45 degrees forward of vertical. And another cord of strategic length, between the front yoke legs and the rear yoke legs, holds the rear yoke at its deployed position of approximately 45 degrees rearward of vertical. When this is the case, the act of lifting the rear yoke will eventually serve to lift the front yoke as well because once the rear yoke is approximately vertical, the yoke linking mechanism will pull the front yoke along. When both yokes are pulled up to their deployed position, their respective crossbars will be at heights such that, when the trolley rail is attached to the yokes, the trolley rail will be approximately horizontal.

Before installing the trolley rail, and with the yokes still temporarily in place, a front yoke brace, initially stored on the front wall, or some other location, is connected between a centered front wall brace and the front yoke's crossbar. This front yoke brace serves to keep the front yoke at the proper orientation regardless of whether the temporary link between the front yoke and rear yoke is taut. Further, it provides support to the front yoke and hence, for the forward end of the trolley rail, for those occasions in which the load suspended from the trolley rail is located at a position far forward in the bed and is thus largely supported by the front yoke.

Once the front and rear yokes are rotated into position and the front yoke brace is fastened, the trolley rail is prepared to be suspended from the yokes. In most embodiments, this involves first joining the two trolley rail segments together. Since the device conveying the load laterally, which in the Preferred Embodiment is a standard beam trolley, is to run along the entire trolley rail, it is essential that the means used to join the two segments not provide any impediment at all to the passage of that conveying device. The bolting flange that is affixed to each segment to facilitate joinder must be designed with that in mind. Once assembled, the trolley rail is ready to be lifted to its deployed position.

The point on the trolley rail where the rear attachment takes place can be designed to be near the rear extremity of the trolley rail, or at a location further forward on the trolley rail, leaving the distal end of the trolley rail cantilevered rearward from the crossbar of the rear yoke. Of course, the further out distally that the trolley rail can be supported, the less strain is introduced in the end of the trolley rail for a given trolley rail strength and given load. This allows the hoist to lift heavier loads for a given trolley rail, or conversely permits a lighter trolley rail to be used with a given load. Providing support for the trolley rail this far out toward the end of the trolley rail also permits heavy loads to be lifter several feet further out from the end of the host truck, thus eliminating the need to remove the tailgate to facilitate loading. Conversely, for given materials and dimension constraints, the further rearward the trolley rail can be extended, the farther from the truck that a load can be manipulated.

Within the scope of the invention, there is a wide range of embodiments where the particular choice being selected shall be based on need and the interconnection between travel length, vertical clearance and trolley rail strain. For example, vertical clearance is increased by configuring the hoist so that the yokes are closer to vertical during operation. Typical of the trade-offs involved in improving a particular operating feature, however, is that additional clearance is obtained at the cost of reducing the load-conveying distance.

On the other hand, if a greater degree of cantilever can be tolerated, the trolley rail can be left the same length as was used with the 45 degree yoke-deployment angle. This will be limited by the degree of trolley rail strain under load that can be tolerated. To a certain extent, greater cantilever stress can be compensated for by using a heavier gauge of metal for the trolley rail, but at the cost of heavier assemblage, and so on.

The trolley rail is designed to receive a slidable or rollable support, such as a beam trolley or internal slide, that can be easily moved along the trolley rail while supporting a heavy object. The most straightforward approach, given that the trolley rail will generally be an I-beam, is to mount a beam trolley so that its wheels can roll along the trolley rail's lower flange. It is a good practice with this approach to provide a stop at each end of the trolley rail so as to restrain the trolley from running off the end of the trolley rail. Also, when this trolley rail is made up of two or more separate I-beam segments, the bolting flanges by which the segments are joined need to be tapered in such a way that the vicinity of the lower flange near the point of joinder has nothing in it to impede the trolley wheels.

The most physically demanding part of assembling the hoist would normally be the act of the lone operator needing to lift the trolley rail up into position at the underside of the two yoke crossbars. The trolley rail, when assembled, weighs approximately 100 lbs when made of steel. Adding to the operator's burden is the necessity to install fasteners through the trolley rail to join it to the two yokes. Although it could be lifted by the operator's muscles alone, the difficulty of these two acts (lifting the trolley rail and installing the fasteners) argues strongly for a mechanical lifting aid. To accomplish this, the Preferred Embodiment makes use of a plate bracket which is attached to the top of the rear yoke crossbar. This plate bracket performs three functions. Two of these functions will be explained later, but first, it is used as a temporary lifting point to mechanically hoist the trolley rail up into position so that it can be firmly attached to the rear yoke crossbar. (Though the plate bracket is used as a temporary lifting point, it remains in place throughout the loading/unloading process due to its need to perform its other functions.) The plate bracket is generally triangular in shape and near its upper corner is a hole to which a pair of mating lifting eyes is temporarily installed so that there is an eye on the right side of the plate bracket and there is an eye on the left side of the bracket. The two hooks of a ratchet cable puller hoist are attached to these eyes with the cable of the ratchet cable puller hoist looped under the assembled trolley rail which is lying loosely on the truck bed parallel with the long axis of the truck. Now the ratchet cable puller hoist is operated to lift the rear end of the trolley rail up off the truck bed so that the rear of the trolley rail is approximately half the distance between the truck bed and the rear yoke crossbar. Now, the operator manually lifts the front end of the trolley rail up and holds it in alignment with its mating hole at the front yoke crossbar and he then installs a bolt or some other suitable fastener. Manual lifting of the front end of the trolley rail is made relatively easy because the ratchet cable puller hoist is supporting most of the weight of the trolley rail during this process. Now, the operator, remaining on the truck bed (or standing on a short step ladder placed near the lowered tailgate) resumes operating the ratchet cable puller hoist until the notch in the trolley rail engages the rear yoke crossbar and the bolt holes in the trolley rail align with the bolt holes in the plate bracket; then bolts are installed and tightened. This not only serves to support the rear of the trolley rail, but it also uses the plate bracket to reinforce the trolley rail to compensate for the fact that a large notch has been cut out of the trolley rail. This is the second of the three functions of the plate bracket mentioned earlier. Now the operator removes the ratchet cable puller hoist and temporary mating eyes and sets them aside. Now, in the Preferred Embodiment, two support struts are connected to the top bolt hole (which was previously used for the mating eyes) in the plate bracket with one strut positioned forward of the plate bracket to bolt to a flange near the bolting flanges of the trolley rail and the other strut is positioned rearward of the plate bracket to bolt to a flange toward the rear end of the trolley rail. This rearward strut serves to reduce cantilever stresses on the trolley rail; hence it allows the use of a lighter gauge trolley rail than would otherwise be necessitated and would be necessitated in the prior art. So it can be seen that the third function of the plate bracket is to provide support for these two support struts.

The present invention contemplates various hoist sizes and strengths, so as to provide portable hoisting capacity corresponding to the truck style and its gross weight rating. For example, the hoist of the invention is adaptable for use with flatbed utility trucks. For mounting on a flatbed truck, the mounting frame, the support frame and other components would be fastenable to the edge of the bed. The length and height of the assembled trolley rail would also be adjusted to take maximum advantage of the constraints provided by the truck, recognizing that the lengths of the segments to be assembled into the trolley rail may be limited by the length of the truck bed. Within these constraints, however, it is possible to choose a shorter or longer trolley rail length, depending on the uses envisioned for the hoist. For example, for use in lifting lighter, harder-to-reach loads, it may be desirable to adjust the deployed yoke angle so that the deployed trolley rail is relatively close to the bed, but is longer and thus extends farther out beyond the back of the bed. Conversely, it may be desirable to have a higher, shorter rail for handling tall objects that lend themselves to positioning just beyond the end of the truck.

In most applications, the hoist of the present invention will be removably attached to the truck by bolts, clamps, straps and/or other easily removable fasteners. Because the hoist, although designed to have minimal weight, does weigh several hundred pounds, this capacity to easily remove much of the hoist system from the truck during periods of non-use is an advantage of the present invention.

Other objects and advantages of the present invention will be made apparent by the following description of the drawings and the detailed description of the Preferred Embodiment of the invention. While a Preferred Embodiment is disclosed, this is not intended to be limiting, rather, the general principles set forth herein are considered to be merely illustrative of the scope of the present invention and it is to be further understood that numerous changes may be made without straying from the scope of the present invention.

BRIEF DESCRIPTION OF THE DRAWINGS

FIG. 6B shows an end-on (orthographic) view of the shape of the connecting flange on each trolley trail segment at the end that is to be joined to the other segment in the Preferred Embodiment.

FIG. 6C shows how the beam trolley can roll past the joinder point of the two trolley rail segments.

FIG. 7 is a side view of the plate bracket.

FIG. 8 is a front view of the plate bracket with the temporary lifting eyes attached.

FIG. 9 is a side view of one of the downriggers in its stowed position, including the fixture that secures the downriggers bottom point to a downrigger stowage flange on the mounting frame.

FIG. 10 illustrates how the free end of one of the downriggers is removably attached to a downrigger stowage flange while the downrigger is stowed.

FIG. 11 is a side view of one of the downriggers with the extension-retractor lever partially lowered so as to cause the retraction of the extension, disengaging the downrigger from the ground.

FIG. 12A is a side view of the attachment of the sidewall brace to the frame rail of the pick-up truck.

FIG. 12B is an end-on view of the sidewall brace attachment shown in FIG. 12A.

FIG. 13 is a side view of the front wall brace as attached to the frame of the pick-up truck.

DETAILED DESCRIPTION OF THE PREFERRED EMBODIMENT

Figure 1:
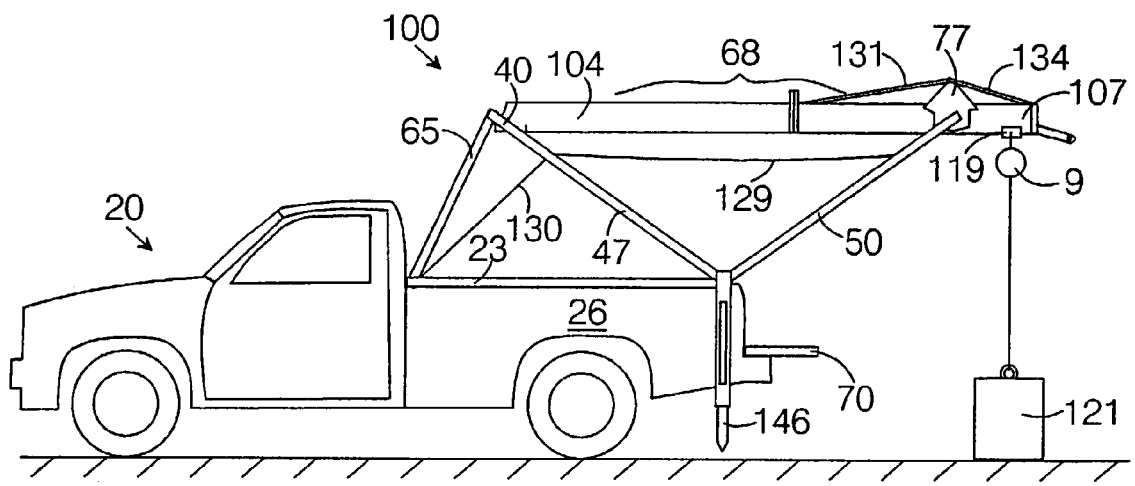
FIG. 1 is a side view of the Preferred Embodiment of the hoist according to the invention, assembled, deployed and starting to lift a load situated behind the host truck, a pickup truck.
Figure 2:
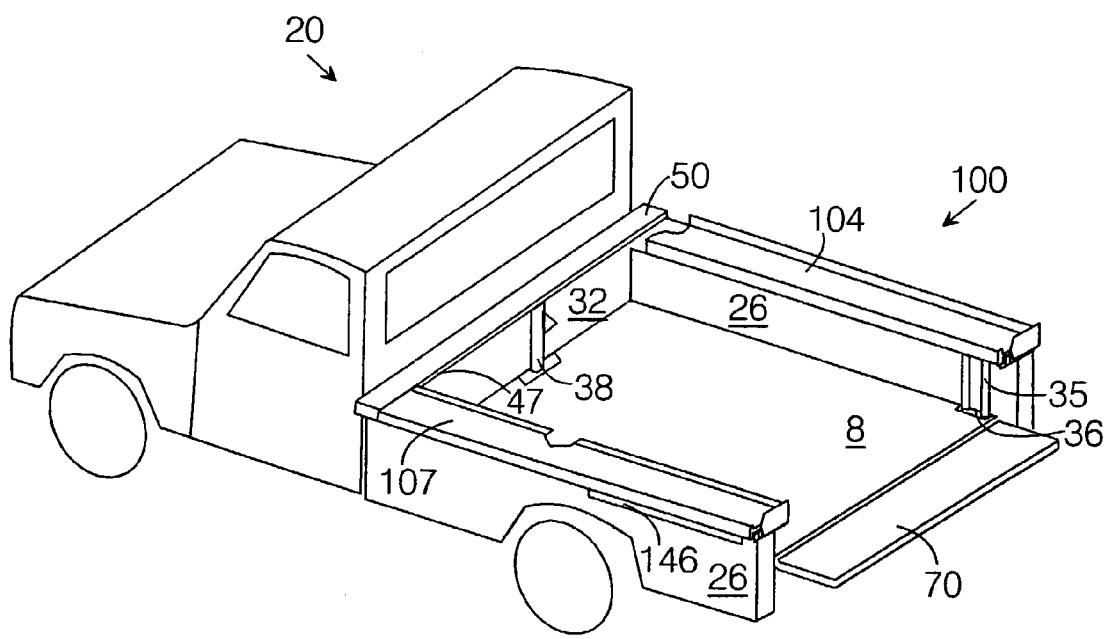
FIG. 2 is a perspective view of the hoist of FIG. 1, collapsed and stowed atop the cargo-bed walls of the host truck.

FIG. 1 and FIG. 2 depict the deployed and stowed configurations, respectively, of the Preferred Embodiment hoist 100 of the invention, mounted on a conventional pick-up truck 20. The truck 20 on which the hoist 100 is mounted has a bed 8 bordered by sidewalls 26, a front wall 32, and a tailgate 70. The hoist 100 includes a mounting frame 23 and a support frame 40. The support frame 40 is made up principally of a front yoke 47, a rear yoke 50 and a front yoke brace 65.

FIG. 1 shows the hoist 100 engaged in starting to lift a load 121, which will be conveyed using a beam trolley 119 along a trolley rail 68. The load 121 is being lifted by the chain hoist 9, which is being supported by the beam trolley 119, which bears on the lower flange of the trolley rail 68. Downriggers 146 are shown attached to that part of the mounting frame 23 that is located near the rear of the sidewalls 26. The downriggers 146 are seen to not quite reach the ground. As more of the load 121 is borne by the trolley rail 68, the rear end of the truck 20 will be forced lower on its suspension, so that the downriggers 146 contact the ground and take over the support of the load 121. One purpose of this action of the downriggers 146 is to prevent the truck from settling down into a position that causes the trolley rail 68 to deviate significantly from the horizontal. The goal is to move the load suspended from the rail 68 by hand, or by a mechanical device such as a ratchet cable puller hoist, to a position where it is over the point in the bed 8 that it will occupy during transport.

As shown in FIG. 11, each of the downriggers 146 incorporates a downrigger extension 152 made up of three pivotally-connected sections and an extension-retractor lever 155, where the extension 152 retracts within a sleeve 149 when said extension-retractor lever 155 is pulled out so as to form a greater angle with respect to said sleeve 149. When one of the downriggers 146 is in its fully extended position on an unloaded truck, the extension 152 terminates a few inches above the ground. As the load 121 starts to be lifted by the deployed hoist 100, the rear end of the truck 20 lowers on its suspension until the extension 152 touches the ground, or touches one or more pads laid on the ground to distribute the load, after which all additional loading is borne by the outriggers 146. After the load is aboard the truck, the lever 155 associated with each of the downriggers 146 is unfastened from its securing point. The lever 155 connects with a middle piece of extension 152 through a side opening in the sleeve 149. As lever 155 is lowered, the external portion of the extension 152 gradually moves up (retracts) into the sleeve 149, thereby slowly transferring the load onto the truck's suspension, which results in a lowering of the truck as that suspension compresses. Each of the downriggers 146 is then pivoted about its associated bearing assembly 126 and attached to the mounting frame 23 for stowage during travel.

FIG. 2 shows the hoist 100 collapsed and stowed atop the sidewalls 26 and the front wall 32, so that nearly the entire area of the bed 8 is left unencumbered and available for other purposes.

Figure 3:
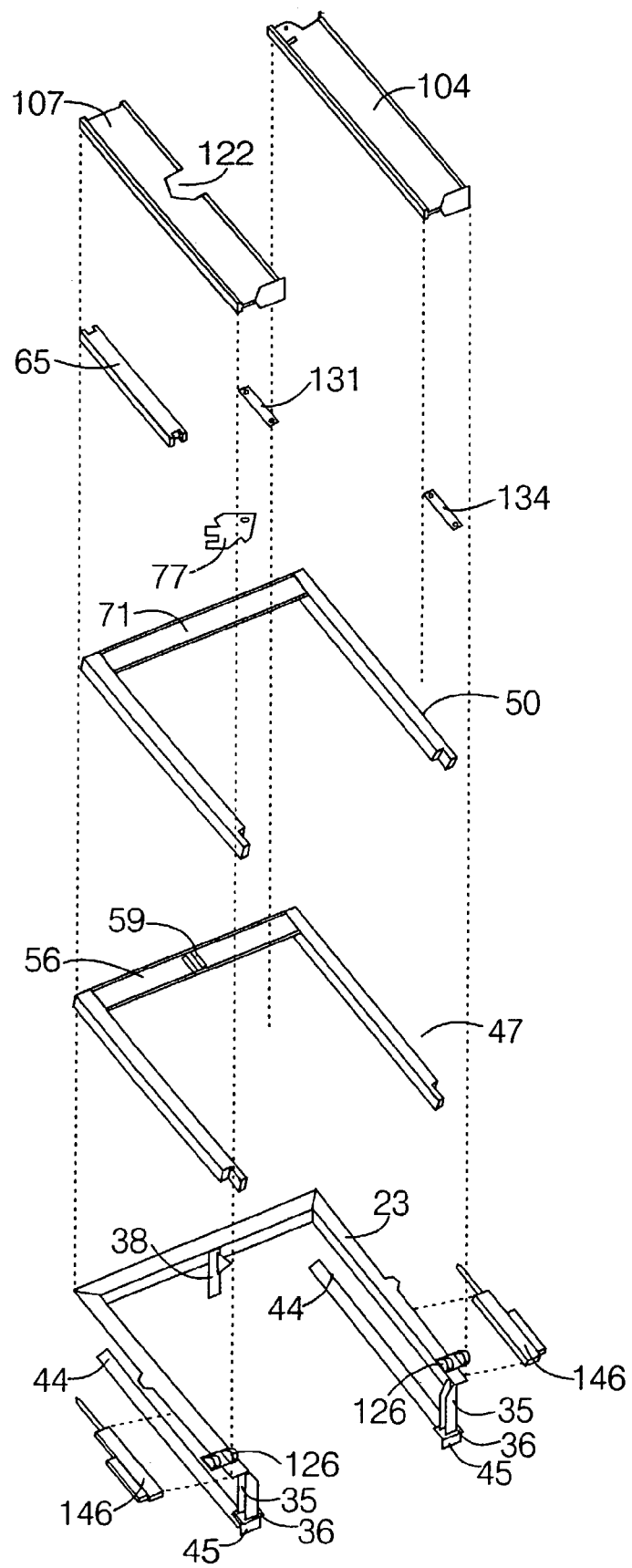
FIG. 3 is an exploded perspective view of the components of the Preferred Embodiment of the hoist.
Figure 4:
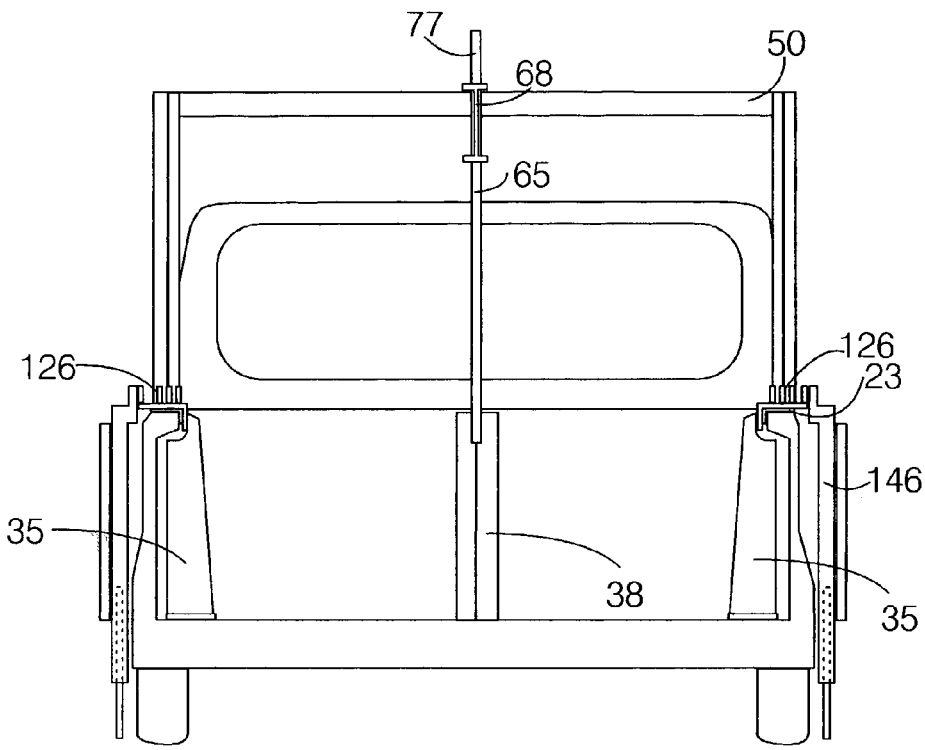
FIG. 4 is a rear view of the assembled, deployed hoist shown in FIG. 1.
Figure 5A:
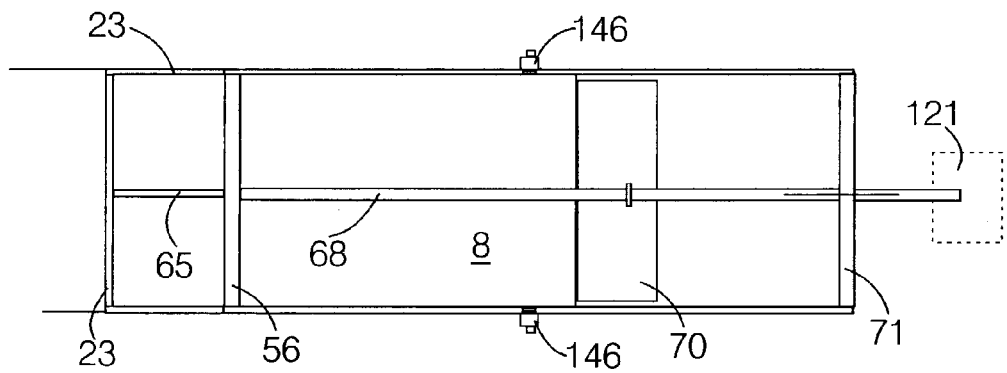
FIG. 5A is a top view of the deployed hoist of FIG. 1.
Figure 5C:
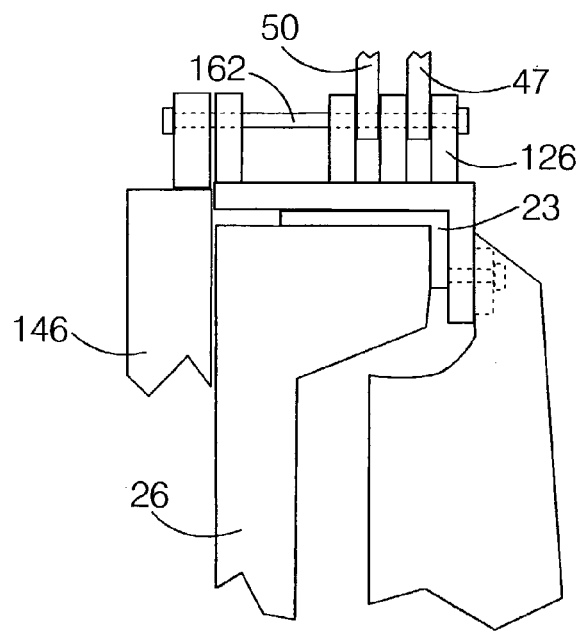
FIG. 5C is an end-on (orthographic) view of the yoke anchor of FIG. 5B, viewed from the front.

FIG. 3 is an exploded view of the hoist 100, as configured when stowed. The deployed mounting frame 23 is shown FIG. 4 with its two sidewall braces 35 and front wall brace 38 extending downward approximately vertically. It should be understood that, although just two sidewall braces 35 are shown in the Preferred Embodiment, additional braces may be installed, depending on the bearing requirements of the embodiment. In the Preferred Embodiment, the sidewall braces 35 are positioned toward the rear of the bed 8. As shown in FIG. 3, FIG. 4, and partially in FIG. 2, affixed at a position adjacent to each of the sidewall braces 35 is a yoke reinforced bearing assembly 126, shown in detail in FIG. 5B and FIG. 5C. The yoke reinforced bearing assembly 126 and its mate on the apposite side of the bed 8 serve as the mounting frame attachment points for the front yoke 47, the rear yoke 50 and the downriggers 146. The yoke reinforced bearing assembly 126 includes a pivot axle 162, shown in FIG. 5C, about which the downriggers 146 pivot downward while being deployed and upward while being stowed, and about which the rear yoke 50 and the front yoke 47 separately pivot upward while being deployed and downward when being stowed.

Figure 5B:
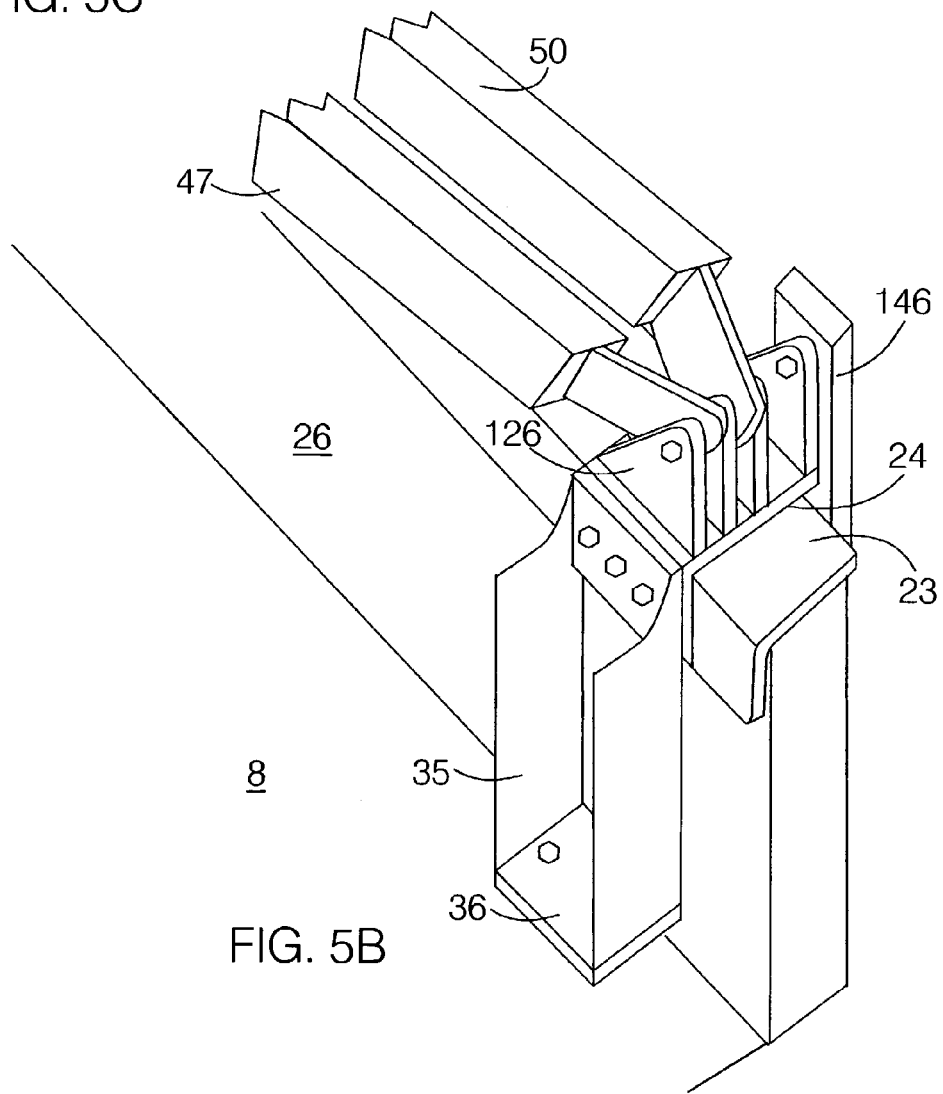
FIG. 5B is a perspective view of one of the yoke bearing assemblies of the Preferred Embodiment.

The mounting frame 23 is directly affixed to the sidewalls 26 and front wall 32, as partially seen in FIG. 1, with bolts being used for this purpose in the Preferred Embodiment. As shown in FIG. 5B, each of the sidewall braces 35 is rigidly bolted at its upper end to the bearing assembly 126. The bearing assembly 126 is welded to the mounting frame 23 thereby forming a welded seam 24. The mounting frame 23 in the Preferred Embodiment is made of angle iron. As shown in FIG. 12A and FIG. 12B, each of the sidewall braces 35 is welded on its lower end to a base plate 36 so that the base plate 36 is an integral part of the sidewall brace 35. Each base plate 36 is connected with bolts through the truck bed 8 and, in the Preferred Embodiment, through a piece of angle iron bed reinforcement 45 that bears up against the bottom of truck bed 8. This angle iron bed reinforcement 45 is a single piece that runs transversely under the truck bed in such a manner that each end of it is situated directly beneath a sidewall brace 35. The angle iron bed reinforcement 45 is in turn supported by means of a threaded rod 160 that connects to pre-existing holes in the truck's longitudinal frame rails 44. Similarly, as shown in FIG. 13, the front wall brace 38 abuts the front wall 32, where it is bolted to the mounting frame 23 and its base rests on the truck bed 8. A threaded rod 161 connects the front wall brace 38 to the truck's frame below by means of a transverse frame rail bracket 350 coupled to a transverse frame rail 351.

By looking at FIG. 1, it can readily be seen that lifting a one ton load 121 would cause extreme moment forces about the yoke bearings 126 which would result in approximately a one ton upward force at the yoke brace 65. By linking the forward wall brace 38 to the truck's frame below, the hoist system is able to tolerate those moment forces.

With reference again to FIG. 1, it can be seen that the support frame 40 is made up of three components, a front yoke 47, a rear yoke 50, and a front yoke brace 65. From FIG. 1, FIG. 3 and FIG. 6A, it can be seen that the trolley rail 68 includes a front rail segment 104 and a rear rail segment 107, and, when the hoist 100 is completely deployed, it is coupled to a plate bracket 77, a front support strut 131 and a rear support strut 134. In the Preferred Embodiment, the rear rail segment 107 has a deep triangular section removed from it at the point where it is connected to the rear crossbar 71. This enables the trolley rail 68 to be positioned even higher than it would be otherwise, consistent with the goal to maximize the vertical clearance while remaining within the constraints imposed on the hoist. These constraints include in particular the fact that in the Preferred Embodiment, the height of the support frame 40 is limited by the length of the bed 8 of the host truck 20. Other embodiments could use yokes with telescoping legs or otherwise extensible legs to increase vertical clearance or lateral conveyance distances. Because the greater vertical clearance is obtained in the Preferred Embodiment at the cost of weakening the rear rail segment 107 by the cut-out, additional strengthening is provided to the trolley rail by the front support strut 131 and the rear support strut 134. Additional strengthening is also provided by the way in which the plate bracket 77 is used in coupling rail segment 107 to the rear crossbar 71.

The operator begins to deploy the hoist 100 by detaching the downriggers 146 from their stowed position alongside the mounting frame 23. The downriggers 146 are allowed to pivot at the bearing assemblies 126, downward so that their lower end is now several inches off the ground; usually it is a good practice to place plywood or metal pads below them to distribute the weight over soft ground. With the downriggers 146 now deployed, the operator removes and temporarily sets aside the front rail segment 104 and the rear rail segment 107, both of which are stowed atop the rear yoke 50 which is supported by the mounting frame 23 which in turn is supported by the sidewalls 26 reinforced by the sidewall braces 35 and the front wall 32 reinforced by the front wall brace 38. Next, the rear yoke 50, the next element down, is rotated by lifting the rear yoke crossbar 71 upward until the rear yoke 50 extends to the rear of the truck 20 at an angle of approximately 45 degrees beyond vertical. In the Preferred Embodiment, the hoist is stowed with an inter-yoke cord 129 (shown in FIG. 1, but not in FIG. 3) of a specific length, connecting the rear yoke 50 to the front yoke 47, such that as the rear yoke 50 is pulled into position as stated, the front yoke 47 is pulled along into its proper support position, which leaves it approximately 45 degrees toward the front of the truck 20. In other words, the inter-yoke cord 129 is chosen and placed so that when the front yoke 47 and the rearyoke 50 are maximally separated, the angle between them will be approximately 90 degrees. Similarly, there isa front yoke cord 130 (shown in FIG. 1) which limits the travel of the front yoke 47. Hence the two yokes 47 and 50 are temporarily held in their approximate deployed position freeing the operator to install the remaining components necessary to deploy the hoist. The next component to be installed is the yoke brace 65 (FIG. 4 and FIG. 5A) which links the front yoke crossbar 56 to the front wall brace 38. In the Preferred Embodiment, the yoke brace 65 is bolted at both connection points.

Figure 6A:
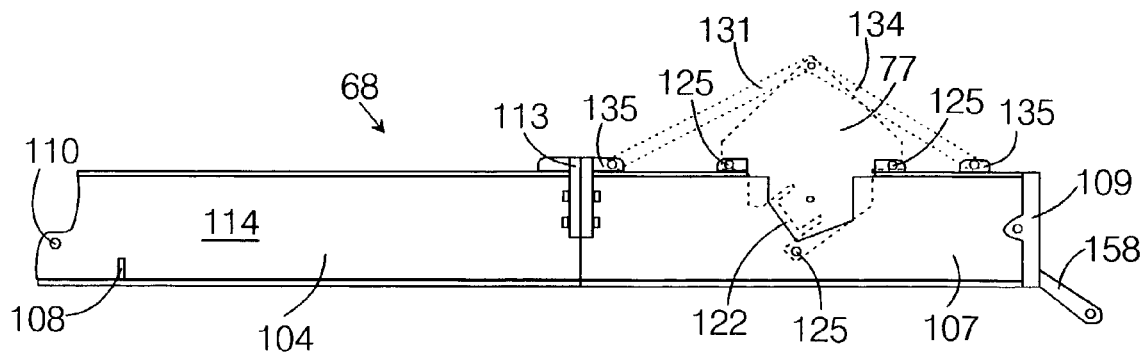
FIG. 6A is a side view of the assembled trolley rail of the Preferred Embodiment.
Figure 14A:
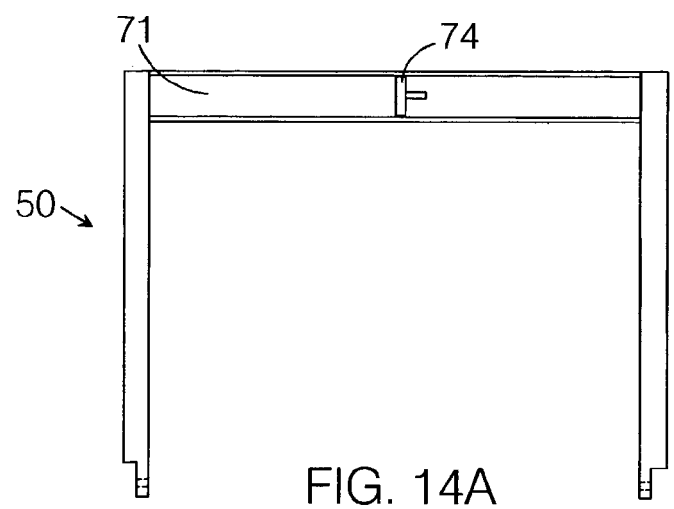
FIG. 14A is a front view of the rear yoke.
Figure 14B:
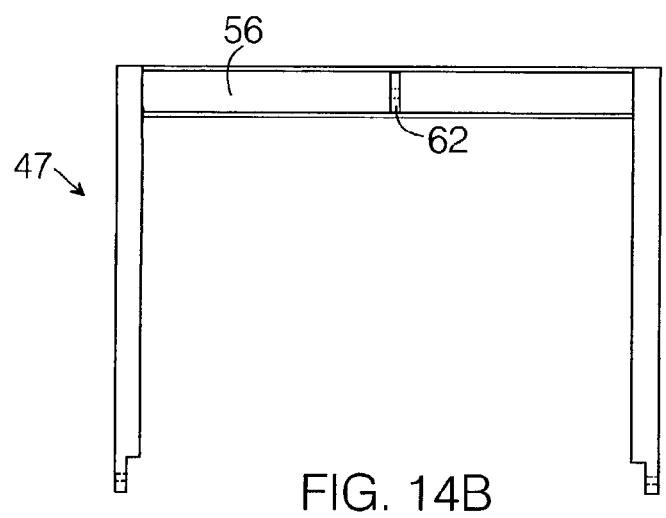
FIG. 14B is a front view of the front yoke.

FIG. 7 shows details of the plate bracket 77 that can be seen in context in FIG. 1. FIG. 1 shows the plate bracket 77 affixed at the point where the deployed rear rail segment 107 is connected to the rear yoke 50. The plate bracket 77, plays an important role in augmenting the strength of the trolley rail 68 at the point where the rear rail segment 107 has a cut-out 122 (FIG. 6A). The plate bracket 77 has a generally triangular top section 80 and a notched bottom section 83. It also has three rail bolt holes 86, two in the top section 80 and one in the bottom section 83. In addition, the top section 80 has a top bolt hole 89 which is used for two different purposes at different times. Top bolt hole 89 is first used to install the temporary lifting eyes 128. Then, when the temporary lifting eyes 128 are no longer needed, they will be removed and the top bolt hole 89 will be used for attaching the front support strut 131 and the rear support strut 134. The bottom section 83 is partially triangular in shape with plate bracket notch 123 cut out of one side. This plate bracket notch 123 is shaped to mate with the rear yoke crossbar 71 As shown in FIG. 14A, the rear yoke crossbar 71 is made of channel iron in the Preferred Embodiment, though it could be made of a number of alternative cross-sections. The plate bracket notch 123 in the bottom section 83 of plate bracket 77 is shaped so that the rear yoke crossbar 71 fits snugly into it and is held in place by a stud 74 on the rear crossbar 71, as shown in FIG. 14A, that mates with notch bolt hole 78 in the plate bracket 77.

FIG. 6A, FIG. 6B, and FIG. 6C depict how a front rail segment 104 bolts together with a rear rail segment 107, to form the trolley rail 68. Both the rail segments are I-beams, consisting of top and bottom flanges separated by a web 114. Both rail segments terminate at one end in a segment-connecting bolting flange 113, at the end that is to be joined to the other segment. The segment-connecting bolting flange 113 extends at a constant width, from a point several inches above the top flange down to approximately the midpoint of the web 114 and tapers in width so that by the time it has reached the bottom flange of the rail segment, it is no wider than the web 114 is thick. Absence of the segment-connecting bolting flange 113 along the bottom of the interface between rear rail segment 107 and front rail segment 104 allows a beam trolley 119 to roll along trolley rail 68 without interference at that interface. In the Preferred Embodiment, the trolley rail segments are steel I-beams with a ten-inch web, two-and-three-quarter-inch flanges and eighth-inch thick steel. The bolting flange 113 is made of one-half inch by four inch flat bar.

The assembled trolley rail 68 can now be laid loosely in the bed 8 of truck 20 parallel to the truck's longitudinal centerline, or if there is cargo on the bed that needs to be unloaded, the trolley rail 68 can be laid atop the cargo if possible or it can be laid along side the cargo if necessary.

Figure 14C:
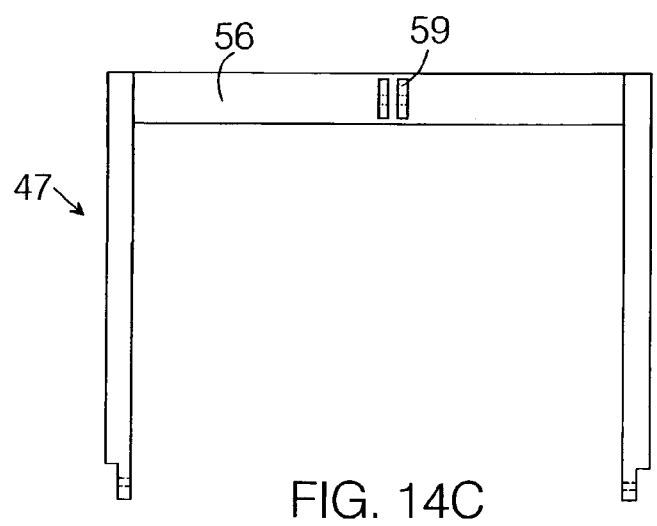
FIG. 14C is a rear view of the front yoke.

Now the temporary lifting eyes 128 are installed in the plate bracket 77 using the top bolt hole 89, as shown in FIG. 7 and FIG. 8. Now the two hooks of a ratchet cable puller hoist are attached to the two temporary lifting eyes 128 with the cable of the ratchet cable puller hoist looped under the assembled trolley rail 68 approximately near the cut-out section 122 of the rear rail segment 107. Now the ratchet cable puller hoist is operated to lift the rear end of the trolley rail 68 up off the truck bed (or cargo) so that the rear of the trolley rail 68 is approximately half the distance between the truck bed 8 and the rear yoke crossbar 71. Now the operator moves to the front end of trolley rail 68 and manually lifts the front end of the trolley rail 68 up and holds the rail front bolt hole 110 in alignment with the front yoke crossbar clevis 59 (FIG. 14C) and then a bolt is installed. The trolley rail 68 will now pivot on this bolt as the ratchet cable puller hoist is operated again to raise the rear end of the trolley rail 68 up to where the cut-out section 122 of the rear rail segment 107 mates with the rear yoke crossbar 71 and the plate bracket 77. With the plate bracket bolt holes 86 (FIG. 7) aligned with trolley rail bolt holes 125 (FIG. 6A) one bolt is now installed to temporarily hold the trolley rail 68 in its deployed position. Now the ratchet cable puller hoist can be removed and set aside and the temporary lifting eyes 128 are removed and set aside. Now the remaining two bolts are installed in bolt holes 125 (FIG.6A) and the front support strut 131 and rear support strut 134 are installed. Both support struts share the top bolt hole 89 on the plate bracket 77 (FIG. 7) as their upper attachment point and their lower attachment points are the two strut flanges 135 (FIG. 6A.) The purpose of front support strut 131 and rear support strut 134 is to strengthen the rear rail segment 107 against bending under the stress of the load. This completes the assembly of the support frame 40. This is the Preferred Embodiment of the deployment method for the Preferred Embodiment hoist.

As shown in FIG. 6C, the beam trolley 119 is now slid onto the lower flange of the trolley rail 68 and a rear stop 109 is bolted to the rear end of the of the trolley rail 68 to prevent the beam trolley 119 from inadvertently rolling off the lower flange of trolley rail 68. The beam trolley 119 is prevented from rolling off the forward end of trolley rail 68 by the front stop 108 (FIG. 6A), which is permanently attached to trolley rail 68.

A chain hoist 9 or other lifting mechanism is now hung from beam trolley 119 and its lower hook attached to load 121; then it is operated to lift the load off the ground to a height so that the bottom of the load will clear the truck bed 8. As the load is lifted off the ground the truck's 20 suspension will compress or lower until the deployed downriggers 146 contact the ground (or a pad on the ground). This will likely cause the truck 20 and trolley rail 68 to tilt slightly so that now the suspended load 121 will need to pulled up a slight incline in order to be positioned over truck bed 8.

For particularly heavy loads, the Preferred Embodiment method calls for a ratchet cable puller hoist to be attached at one end to either the load 121 or to the beam trolley 119 and at the other end to the front frame brace 65 or any other suitable attachment point. The load 121 is then pulled into the cargo area using the mechanical advantage of the ratchet cable puller hoist and lowered by means of the chain hoist 9 to the bed 8 at a desired location.

With the load 121 now resting the cargo bed 8, the operator now needs to make a decision. He needs to give consideration to the following issues. First, the weight of the deployed hoist 100 puts more strain on the truck's 20 rear suspension than a disassembled and stowed hoist 100. Therefore, if the weight of load 121 is at or near the weight bearing capacity of truck 20, it is recommended that hoist 100 be disassembled and stowed before retracting downriggers 146. But if the weight of hoist 100 plus the weight of load 121 are considerably less than the recommended weight capacity of truck 20, then the operator may choose to retract and stow downriggers 146 while leaving hoist 100 in the assembled/deployed configuration. He must not do this, however, if there is a chance that the assembled/deployed hoist 100 may be a hazard to safe operation of truck 20. If safe operation of truck 20 is in question, hoist 100 must be disassembled and stowed prior to moving truck 20.

For off-loading a heavy object, a ratchet cable puller is anchored to a dedicated eye 158 that is an integral part of rear stop 109 (FIG. 6A), and is used to pull a suspended load rearward to facilitate offloading.

It should be understood that the Preferred Embodiment set out here is merely illustrative of the present invention. Numerous variations in design and use of the present invention will be obvious to one skilled in the art, in view of the following claims, without straying from the scope and field of the invention as disclosed herein above.

I claim:

1. A collapsible hoist system capable of lifting an object having a significant weight, said hoist system being detachably mountable on a pickup truck having a truck frame and a cargo bed, said bed having a bed length and said bed being surrounded by two sidewalls, and a front wall, and wherein said hoist system when collapsed is capable of being completely stowed atop said two sidewalls and said front wall with no portion of said hoist system extending beyond said bed, said hoist system comprising
    a) a mounting frame,
    b) a front yoke, a rear yoke, and a yoke brace,
    c) a rail, and
    d) a pair of downriggers,
    e) a pair of sidewall braces,
    f) a front wall brace
    wherein said mounting frame is constructed of three metal beams including a mounting frame front member and two mounting frame side members and wherein a yoke bearing is attached to a distal end of each of said side members,
    wherein with said hoist system detachably mounted on said pickup truck with said truck on a level surface, said front yoke, said rear yoke, and said downriggers are each pivotally attached to a pivot axle incorporated in each of said yoke bearings,
    wherein said downriggers are positioned when deployed to support said object and are structured so as to be retractable under load, wherein said rear yoke is capable of being rotated about said yoke bearing independently of said front yoke, and wherein said rear yoke includes two yoke legs and a rear crossbar, wherein said rear crossbar joins said yoke legs, wherein said rear crossbar is oriented substantially horizontally, and wherein said rear crossbar is configured to mate with a rear connection point of said rail,
    wherein said front yoke includes a front crossbar oriented substantially horizontally, and
    wherein said front crossbar is configured to mate with a front connection point of said rail and wherein said front crossbar is also configured to mate with said yoke brace,
    wherein said rail is made up of two I-beams including a front I-beam and a rear I-beam, said rear I-beam having a cut-out portion incorporating said rear connection point, and said front I-beam including a front connection point at a proximal end of said front I-beam,
    wherein each of said sidewall braces is bolted at a top end thereof to said mounting frame and wherein each of said sidewall braces is welded at a bottom end thereof to a base plate, wherein said base plate is configured to rest on said bed and to be coupled by a supporting link to said truck frame, said supporting link passing through said bed,
    wherein said front wall brace is configured to connect to a bottom end of said yoke brace so as to provide support for said yoke brace and wherein said front wall brace is adjustably coupled to and supported by said truck frame.

2. A method for one person acting alone to lift a heavy object from a fixed location onto a pickup truck and to drive off with said object, using a collapsible hoist detachably mountable on a pickup truck of a particular load-bearing capacity, said pickup truck having a suspension, longitudinal frame rails, transverse frame rails, and a cargo bed, said bed having a bed length and said bed having adjacent to it two sidewalls and a front wall, said hoist when mounted on said pickup truck being capable of lifting and conveying to said bed an object weighing up to said load-bearing capacity, said hoist comprising:
    (a) a mounting frame configured to be placed atop said sidewalls and said front wall, wherein said mounting frame includes reinforcement elements configured to shift vertical load away from said sidewalls and away from said front wall whenever said hoist is bearing said object,
    (b) a support frame pivotally connectable to said mounting frame at a distal end of said mounting frame, wherein said mounting frame is made up of two parallel mounting-frame sides connected to each other at a front end by a mounting-frame front which spans a distance between said mounting-frame sides, wherein said mounting-frame sides have a length substantially equal to said bed length and said mounting-frame front has a length such that said mounting frame can be laid on said truck with said mounting-frame front lying substantially along said front wall and each of said mounting-frame sides lying substantially along one of said side walls, and wherein said mounting frame, when attached to said truck, has a plurality of sidewall braces extending between said mounting-frame sides and said bed, and a front wall brace extending between said mounting-frame front and said bed,
    (c) a rail configured to be supported by said support frame and to permit a conveying device mounted on said rail to be longitudinally moved along said rail while said conveying device is supporting and conveying said object, wherein said rail is comprised of a front segment and a rear segment wherein neither said front segment nor said rear segment is of greater length than said bed, and wherein said front segment and said rear segment are both I-beams and wherein said front segment and said rear segment is each terminated by a joinder flange at a joinder end, wherein said joinder flange permits said front segment to be joined with said rear segment in such a manner that said conveying device can move without interference from said front segment to rear segment and from said rear segment to said front segment,
    wherein said sidewall braces are supported from below said bed by being affixed to said longitudinal frame rails of said truck, wherein said front wall brace is supported from below said bed by being affixed to and supported by one or more of said frame rails by means of an adjustable-length coupling, wherein said mounting frame has yoke bearings located at said distal end of said mounting frame, and wherein said support frame comprises a front yoke, a bottom end, thereof being pivotally connectable to said yoke bearings, and a rear yoke, a bottom end thereof being pivotally connectable to said yoke bearings, (d) a pair of downriggers comprising a right downrigger and a left downrigger, said downriggers being located at said distal end of said mounting frame, wherein said downriggers are designed to bear a major portion of said weight during loading and off-loading of said object, and wherein said downriggers are configured so as to be manually retractable by a single operator while said downriggers are under compressive load, wherein each of said downriggers has a fixed end pivotally attachable to one of said yoke bearings and a free end removably affixable to a downrigger flange that extends outward from one of said mounting-frame sides, and wherein each of said downriggers, when so attached and so affixed, can be deployed by detaching said free end from said downrigger flange and allowing said downrigger to swing downward through approximately ninety degrees, and wherein each of said downriggers can be stowed by first relieving said compressive load from said downrigger and then swinging said free end up to said downrigger flange and removably affixing said free end to said downrigger flange, wherein said front yoke and said rear yoke can be pivoted independently about said yoke bearings, restrained only by a yoke-linking means having a linking length, wherein said yoke-linking means prevents said front yoke from forming with said rear yoke a separation angle greater than a maximum separation angle, and wherein said yoke-linking means is a yoke-rope tied at a first rope end to a rear leg of said rear yoke and at a second rope end to a front leg of said front yoke and wherein said linking length is chosen to cause said maximum separation angle to be approximately 90 degrees, and wherein said rear rail section is provided with a cut-out designed to accept a plate bracket, wherein said plate bracket is configured to be affixed to said rear yoke cross bar and to couple said rear yoke cross bar and said rear rail section when said rear rail section is raised up underneath said rear yoke cross bar, said method comprising the steps of:

a) backing said truck toward said object, halting with approximately six feet separating said truck from said object, b) deploying said downriggers, c) removing said front segment and said rear segment from atop said mounting frame, d) grasping said rear yoke crossbar and swinging said rear yoke up until said rear yoke is extending out beyond said truck, at an operating angle of approximately 45 degrees relative to vertical, e) temporarily stabilizing said rear yoke at said operating angle, f) attaching a second yoke rope between said mounting frame and said front yoke to limit travel of said front yoke to approximately 45 degrees from horizontal, g) bolting an upper end of said yoke brace to said front yoke crossbar, h) bolting a lower end of said yoke brace to said front wall brace, i) bolting said front rail segment to said rear rail segment at said joinder flange so as to form said rail, j) affixing said plate bracket to said rear yoke crossbar, k) installing temporary lifting eyes to a top hole of said plate bracket and inserting two hooks of a ratchet cable puller into two temporary lifting eyes and looping a cable of said ratchet cable puller under a rear end of said rail, l) lifting said rear end of said rail using said rachet cable puller so that said cutout area is brought into proximity with said rear yoke crossbar, m) manually lifting a forward end of said rail and affixed said forward end to said front yoke crossbar, n) resuming operation of said ratchet cable puller to further raise said rear end to mate with said cut-out area with said plate bracket and said rear yoke crossbar and affixing said rail to said plate bracket with bolts, o) removing said ratchet cable puller and said temporary lifting eyes, p) placing a beam trolley on said rail and bolting a rear stop to said rear end of said rail so at to prevent said beam trolley from rolling off said rear end of said rail, q) causing said beam trolley to roll along said rail until said beam trolley is approximately above said object to be moved, r) attaching a chain hoist between said beam trolley and said object, s) pulling on a hand chain of said chain hoist so as to lift said object to a position higher than said bed, t) causing said beam trolley to move forward on said rail until said object is above an appropriate carrying location on said bed, u) releasing said chain hoist, permitting said object to move downward onto said bed, v) stowing said hoist in reverse order to that by which said hoist was assembled, w) retracting said downriggers so as to shift a weight of said object completely onto truck, and then swinging said downriggers in retracted configuration around and affixing said free end of each of said downriggers to said downrigger flanges, x) drive said truck containing said object to any desired or required location.

3. A collapsible hoist mountable on a pickup truck, said pickup twck having a suspension, longitudinal frame rails, transverse frame rails, and a cargo bed, said bed having a bed length and said bed being surrounded by two sidewalls, a front wall, and a tailgate, said hoist comprising:

(a) a mounting frame made up of two parallel mounting-frame sides connected to each other at a front end by a mounting-frame front which spans a distance between said mounting-frame sides, wherein said mounting-frame sides have a length substantially equal to said bed length and said mounting-frame front has a length such that said mounting frame can be laid on said truck with said mounting-frame front lying substantially along said front wall and each of said mounting-frame sides lying substantially along one of said side walls, and wherein said mounting frame has yoke bearings located at a distal end of said mounting frame, a support frame pivotally connectable to said mounting frame at said distal end of said mounting frame, wherein said support frame comprises a front yoke, a bottom end thereof being pivotally connectable to said yoke bearings, and a rear yoke, a bottom end thereof being pivotally connectable to said yoke bearings, wherein said front yoke and said rear yoke can be pivoted independently about said yoke bearings, restrained only by a yoke-linking means having a linking length, wherein said yoke-linking means prevents said front yoke from forming with said rear yoke a separation angle greater than a maximum separation angle, (c) an I-beam rail configured to be supported by said support frame and to permit a conveying device mounted on said rail to be longitudinally moved along said rail while said conveying device is supporting and conveying said object, wherein said rail is comprised of a front segment and a rear segment, wherein neither front segment nor said rear segment exceeds said bed length, and wherein said front segment and said rear segment is each terminated by a joinder flange at a joinder end, wherein said joinder flange permits said front segment to be joined with said rear segment in such a manner that said conveying device can move without interference from said front segment to rear segment and from said rear segment to said front segment, (d) a pair of downriggers comprising a right downrigger and a left downrigger, said downriggers being located at said distal end of said mounting frame, wherein said downriggers are designed to bear a major portion of said weight during loading and off-loading of said object, and wherein said downriggers are configured so as to be manually retractable by a single operator while said downriggers are under compressive load, wherein said mounting frame, when attached to said truck, has a plurality of sidewall braces extending between said mounting-frame sides and said bed, and a front wall brace extending between said mounting-frame front and said bed, wherein said sidewall braces are supported from below said bed by being affixed to said longitudinal frame rails of said truck and wherein said front wall brace is supported from below said bed by being affixed to and supported by one or more of said frame rails by means of an adjustable-length coupling, and wherein each of said downriggers has a fixed end pivotally attachable to one of said yoke bearings and a free end removably affixable to a downrigger flange that extends outward from one of said mounting-frame sides, and wherein each of said downriggers, when so attached and so affixed, can be deployed by detaching said free end from said downrigger flange and allowing said downrigger to swing downward through approximately ninety degrees, and wherein each of said downriggers can be stowed by first relieving said compressive load from said downrigger and then swinging said free end up to said downrigger flange and removably affixing said free end to said downrigger flange.

4. The hoist of claim 3 wherein said yoke-linking means is a yoke-rope tied at a first rope end to a rear leg of said rear yoke and at a second rope end to a front leg of said front yoke and wherein said linking length is chosen to cause said maximum separation angle to be approximately 90 degrees.

5. The hoist of claim 3 wherein adjacent to said yoke bearing is mounted an angle-fixing means such that once said rear yoke has been rotated about said yoke bearing to a particular operating angle, said angle-fixing means will removably hold said rear yoke at said operating angle.

* * * * *